United States Patent
Jeong et al.

(10) Patent No.: US 12,522,557 B2
(45) Date of Patent: *Jan. 13, 2026

(54) METHOD OF PREPARING DIESTER-BASED MATERIAL

(71) Applicant: LG CHEM, LTD., Seoul (KR)

(72) Inventors: Jae Hun Jeong, Daejeon (KR); Sung Kyu Lee, Daejeon (KR); Yeon Uk Choo, Daejeon (KR); Song Hoon Lee, Daejeon (KR); Hyoung Jun, Daejeon (KR); Yun Gon Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 965 days.

This patent is subject to a terminal disclaimer.

(21) Appl. No.: 17/640,652

(22) PCT Filed: Aug. 20, 2021

(86) PCT No.: PCT/KR2021/011082
§ 371 (c)(1),
(2) Date: Mar. 4, 2022

(87) PCT Pub. No.: WO2022/108049
PCT Pub. Date: May 27, 2022

(65) Prior Publication Data
US 2023/0150910 A1    May 18, 2023

(30) Foreign Application Priority Data
Nov. 17, 2020   (KR) .......................... 10-2020-0153934

(51) Int. Cl.
*C07C 67/08* (2006.01)
*B01J 19/18* (2006.01)
(Continued)

(52) U.S. Cl.
CPC ............ *C07C 67/08* (2013.01); *B01J 19/245* (2013.01); *C07C 67/48* (2013.01); *C07C 67/54* (2013.01);
(Continued)

(58) Field of Classification Search
None
See application file for complete search history.

(56) References Cited

U.S. PATENT DOCUMENTS

| | | | |
|---|---|---|---|
| 12,084,413 B2 * | 9/2024 | Jeong | ............ C07C 69/80 |
| 2011/0251420 A1 * | 10/2011 | Disteldorf | ............ C07C 67/08 560/99 |
| 2022/0185761 A1 * | 6/2022 | Jeong | ............ B01J 19/0066 |

FOREIGN PATENT DOCUMENTS

| | | |
|---|---|---|
| CN | 102256923 A | 11/2011 |
| CN | 102295564 A | 12/2011 |

(Continued)

OTHER PUBLICATIONS

Machine generated English language translation of Teijin (JP2006143612A, published on Jun. 8, 2006) (Year: 2025).*

(Continued)

*Primary Examiner* — Amy C Bonaparte
(74) *Attorney, Agent, or Firm* — Morgan, Lewis & Bockius LLP

(57) ABSTRACT

Provided is a method of preparing a diester-based material, more particularly, a method of preparing a diester-based material, which is carried out by a continuous preparation process of a diester-based material including a reaction part in which a total of n reaction units from a first reaction unit to an nth reaction unit are connected in series, the reaction unit including a reactor which esterifies dicarboxylic acid and alcohol, including: esterifying dicarboxylic acid and alcohol in a reactor of the first reaction unit to produce a reaction product, and supplying a lower discharge stream including the reaction product to a reaction unit at a rear end through a lower discharge line; and supplying a liquid material through a liquid supply line connected to a lower discharge line of the reactor of the first reaction unit.

17 Claims, 3 Drawing Sheets

(51) Int. Cl.
*B01J 19/24* (2006.01)
*C07C 67/48* (2006.01)
*C07C 67/54* (2006.01)
*C07C 69/82* (2006.01)

(52) U.S. Cl.
CPC .......... *C07C 69/82* (2013.01); *B01J 19/1862* (2013.01); *B01J 2204/00* (2013.01); *B01J 2219/0004* (2013.01); *B01J 2219/00051* (2013.01); *B01J 2219/00162* (2013.01); *B01J 2219/00247* (2013.01); *B01J 2219/00252* (2013.01); *B01J 2219/00353* (2013.01)

(56) References Cited

FOREIGN PATENT DOCUMENTS

| CN | 102503831 A | 6/2012 |
|---|---|---|
| JP | S49-035611 B | 9/1974 |
| JP | S52-19601 A | 2/1977 |
| JP | H11-049726 A | 2/1999 |
| JP | 2006-143612 A | 6/2006 |
| JP | 2012-512229 A | 5/2012 |
| KR | 10-0844811 B1 | 7/2008 |
| KR | 10-2009-0004359 A | 1/2009 |
| KR | 10-2009-0115125 A | 11/2009 |
| KR | 10-2009-0130042 A | 12/2009 |
| KR | 10-2011-0101205 A | 9/2011 |
| KR | K10-2014-0000296 A | 1/2014 |
| KR | 10-2014-0135241 A | 11/2014 |
| KR | 10-1663586 B1 | 10/2016 |
| KR | 10-2019-0027623 A | 3/2019 |
| KR | 10-2162204 B1 | 10/2020 |
| NL | 2021197 B1 | 1/2019 |
| WO | 2020/204558 A1 | 10/2020 |
| WO | 2021/002700 A1 | 1/2021 |

OTHER PUBLICATIONS

International Search Report and Written Opinion issued in corresponding International Patent Application No. PCT/KR2021/011082, dated Dec. 1, 2021.

Extended European Search Report dated Nov. 23, 2022, issued in corresponding European Patent Application No. 21859368.9.

* cited by examiner

[FIG. 1]
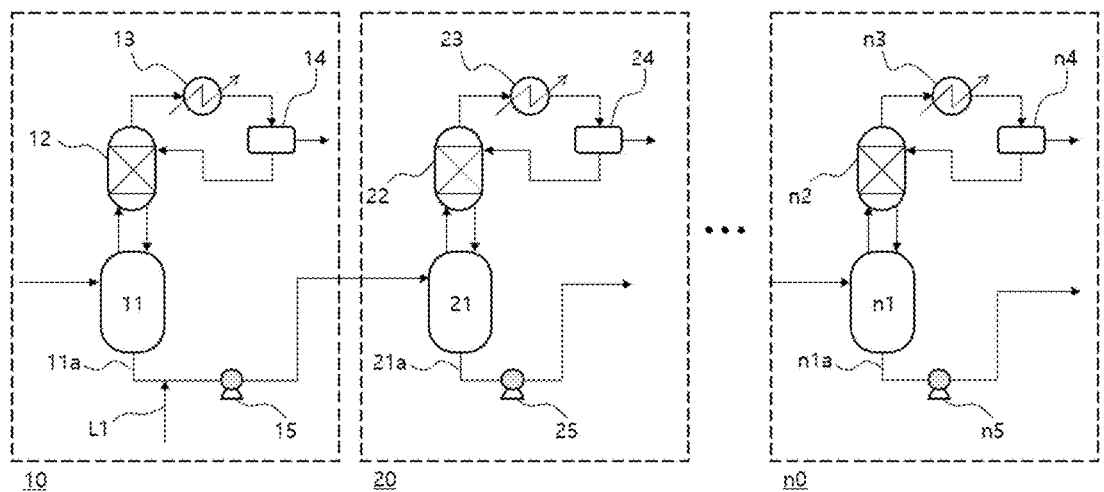
[FIG. 2]
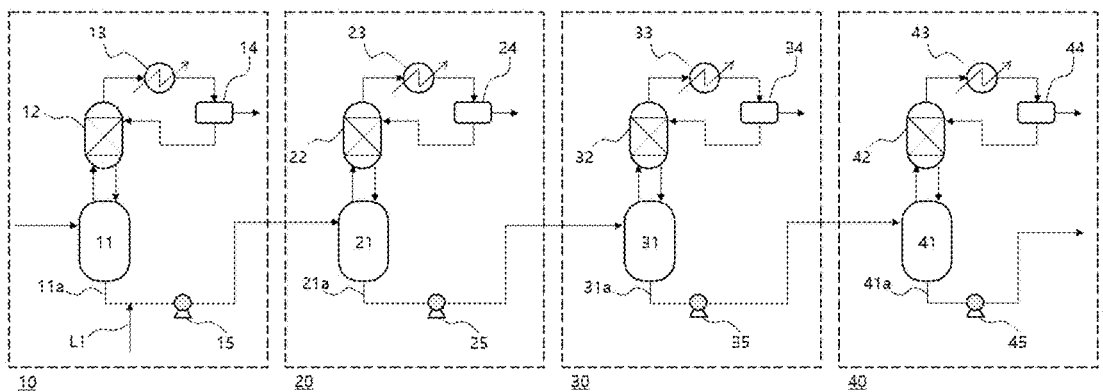

[FIG. 3]
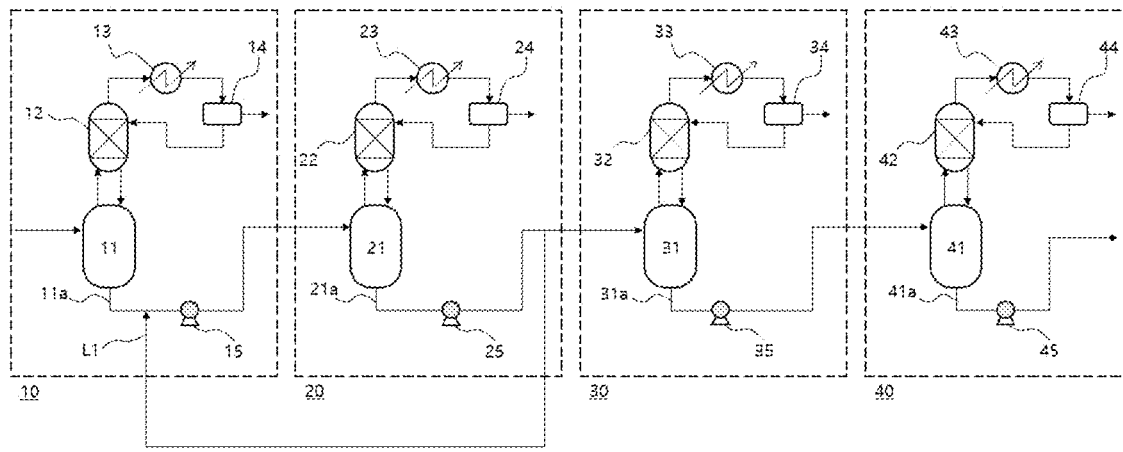
[FIG. 4]
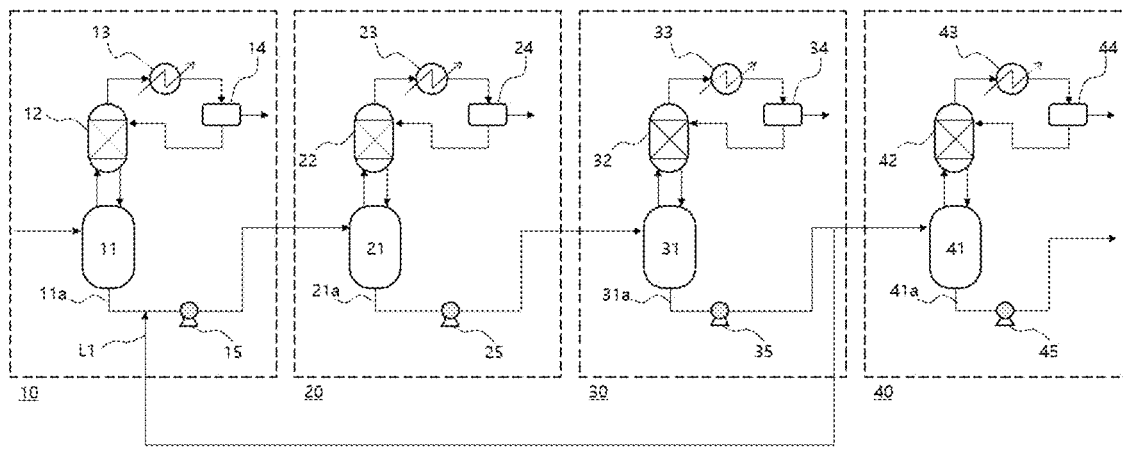
[FIG. 5]
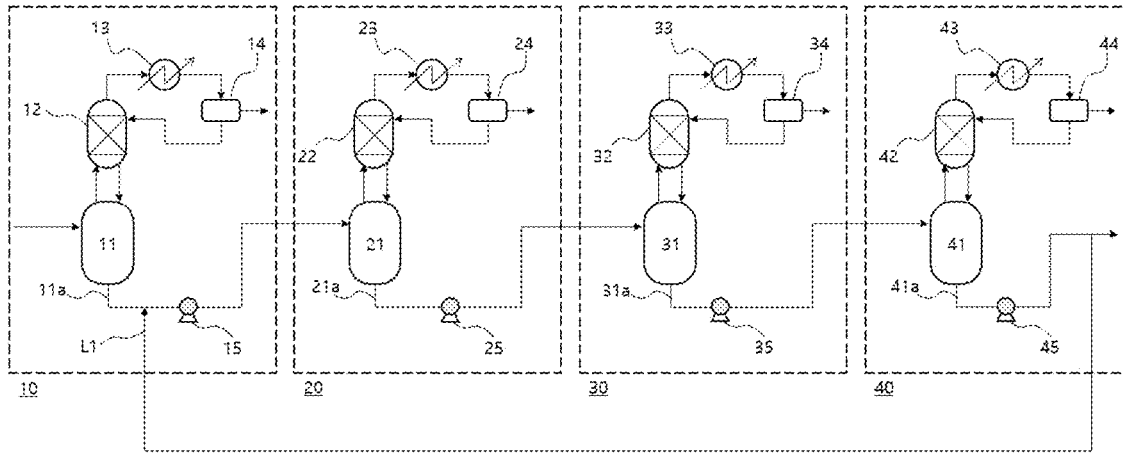

[FIG. 6]
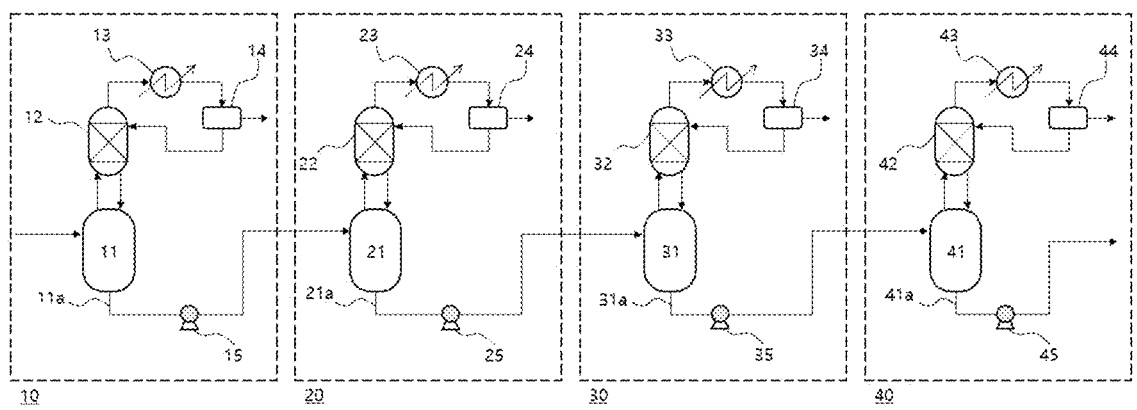
[FIG. 7]
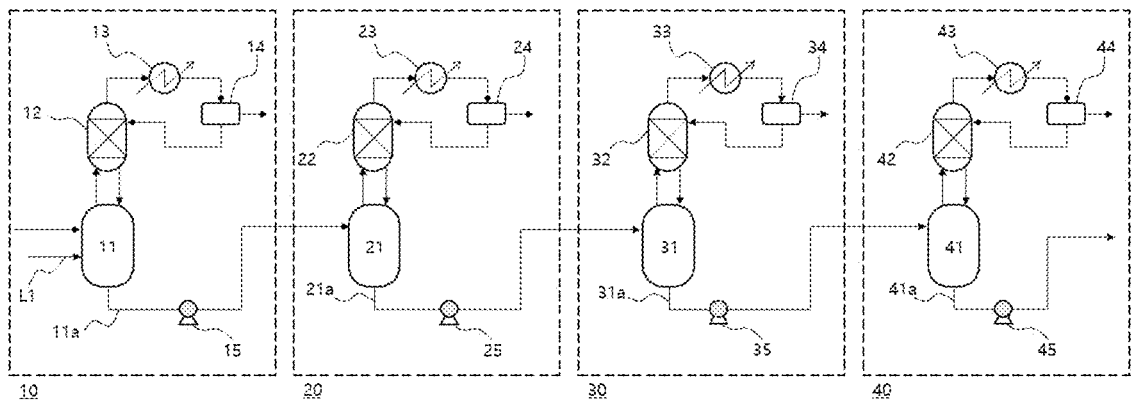

METHOD OF PREPARING DIESTER-BASED MATERIAL

CROSS-REFERENCE TO RELATED APPLICATIONS

The present application claims the benefit of priority to Korean Patent Application No. 10-2020-0153934, filed on Nov. 17, 2020, the entire contents of which are incorporated herein as a part of the specification.

TECHNICAL FIELD

The present invention relates to a method of preparing a diester-based material, and more particularly, to a method of preparing diester-based material which may prevent clogging of pipes, pumps, and the like due to accumulation of unreacted materials in a lower discharge stream from a reactor including a reaction product when continuously preparing a diester-based material.

BACKGROUND ART

A phthalate-based plasticizer, which accounts for 92% of the global plasticizer market until the 20th century, and is an additive mainly used for imparting flexibility, durability, cold resistance, and the like to polyvinyl chloride (PVC) and lowering melt viscosity to improve processability, is introduced to PVC at various contents to be more closely related to real life than any other materials, ranging from hard products such as hard pipes to soft products which may be used for food packaging, blood bags, flooring, and the like which are soft and stretch easily, and to be widely used as an application in which a direct contact with a human body is inevitable.

However, in spite of the compatibility with PVC and excellent softness imparting properties of the phthalate-based plasticizer, recently, controversy over harmfulness that, in the real use of a PVC product containing the phthalate-based plasticizer, the phthalate-based plasticizer may leak out of the product little by little to act as a suspected endocrine disruptor (environmental hormone) and a carcinogen at a heavy metal level is rising. In particular, since it was reported that di-(2-ethylhexyl) phthalate (DEHP) which is the most used among the phthalate-based plasticizers in the US in the 1960s leaks out of a PVC product, interest in environmental hormones increased in the 1990s and various studies on harmfulness of the phthalate-based plasticizer to a human body began to be conducted.

Thus, research for developing an environment-friendly plasticizer for replacing di(2-ethylhexyl)phthalate and improving the process is being conducted by many researches, in order to respond to environmental hormone problems and environmental regulations due to release of a diester-based phthalate-based plasticizer, in particular, di(2-ethylhexyl) phthalate.

Meanwhile, a batch process is applied to the process of preparing the diester-based plasticizer in most industry sites, and as the batch process, a system for reflux of unreacted materials and efficient removal of by-products in a reactor has been developed. However, preparation of the diester-based plasticizer by the batch process has a limitation in a reflux amount or steam amount improvement, has very low processability, and actually has a technical limitation in application for improving problems.

In addition, in order to solve the problems of the batch process having the problems described above, when the diester-based plasticizer is prepared, a process having a reaction part in which two or more reactors are connected in series has been developed. However, in this case, unlike the batch process in which only products are transferred after the reaction is completed, a continuous preparation process in which a plurality of reactors are connected in series or in parallel is used, whereby not only the products but also the unreacted materials are transferred in a mixed slurry state when being transferred to the next reactor. For this reason, the content of the unreacted material in the reaction product in the first reactor is high. Therefore, a solid unreacted material in a slurry flow accumulates in pipes and pumps in which the reaction product discharged from the first reactor is transferred, thereby decreasing flowability for transferring the reaction product to a reactor at a rear end, so that the pipes easily clog and an operation cycle is shortened.

DISCLOSURE

Technical Problem

An object of the present invention is to provide a method of preparing a diester-based material, which produces an environmentally friendly diester-based material as a plasticizer by a continuous process, in which flowability for transferring a reaction product discharged from a reactor of a first reaction unit to a reactor at a rear end is improved, thereby extending a maintenance period of pipes and pumps, in order to solve the problems mentioned in the Background Art.

Technical Solution

In one general aspect, a method of preparing a diester-based material, which is carried out by a continuous preparation process of a diester-based material including a reaction part in which a total of n reaction units from a first reaction unit to an nth reaction unit are connected in series, the reaction unit including a reactor which esterifies dicarboxylic acid and alcohol, includes: esterifying dicarboxylic acid and alcohol in a reactor of the first reaction unit to produce a reaction product, and supplying a lower discharge stream including the reaction product to a reaction unit at a rear end through a lower discharge line; and supplying a liquid material through a liquid supply line connected to the lower discharge line of the reactor of the first reaction unit.

Advantageous Effects

According to the present invention, when a diester-based material is prepared by a continuous process, a liquid supply line is connected to a lower discharge line of a reactor of a first reaction unit to supply a liquid material, thereby increasing a linear velocity of the lower discharge stream of the reactor of the first reaction unit to a limit velocity or more to improve flowability, without an increase in a steam amount supplied to the reactor.

In addition, an unreacted material may be prevented from accumulating in pipes and pumps for transferring the lower discharge stream from the reactor of the first reaction unit.

DESCRIPTION OF DRAWINGS

FIGS. 1 to 5 are process flow diagrams for a method of preparing a diester-based material according to an exemplary embodiment of the present invention, respectively.

FIGS. 6 and 7 are process flow diagrams for a method of preparing a diester-based material according to the comparative examples, respectively.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In the present invention, the term "upper portion" means a portion corresponding to a height at or above 50% of a total height of an apparatus in a container and the term "lower portion" means a portion corresponding to a height less than 50% of a total height of an apparatus in a container or an apparatus.

The term "stream" in the present invention may refer to a fluid flow in a process, or may refer to a fluid itself flowing in a pipe. Specifically, the stream may refer to both a fluid itself flowing in a pipe connecting each device and a fluid flow. In addition, the fluid may refer to a gas, a liquid, and the like. A case in which a solid substance is included in the fluid is not excluded.

Hereinafter, the present invention will be described in more detail with reference to the FIGS. 1 to 5 for better understanding of the present invention.

According to the present invention, a method of preparing a diester-based material is provided. The preparation method is carried out by a continuous preparation process of a diester-based material including a reaction part in which a total of n reaction units 10, 20, and n0 from a first reaction unit 10 to an nth reaction unit n0 are connected in series, the reaction unit including a reactor 11, 21, or n1 which esterifies dicarboxylic acid and alcohol, and includes: esterifying dicarboxylic acid and alcohol in a reactor 11 of the first reaction unit 10 to produce a reaction product, and supplying a lower discharge stream including the reaction product to a reaction unit at a rear end through a lower discharge line 11*a*; and supplying a liquid material through a liquid supply line L1 connected to the lower discharge line 11*a* of the reactor of the first reaction unit.

According to an exemplary embodiment of the present invention, the diester-based material may be prepared by a continuous preparation process including a reaction part in which a total of n reaction units from a first reaction unit to an nth reaction unit are connected in series.

Specifically, conventionally, in the preparation of the diester-based material, a batch preparation process was applied. However, preparing a diester-based material by the batch process has a limitation in improvement of a reflux amount of a steam amount, has very low productivity, and has a technical limitation to be applied for improving problems.

In addition, in order to solve the problems of the batch process having the problems described above, when the diester-based material is prepared, a continuous process having a reaction part in which two or more reactors are connected in series has been developed. However, in this case, unlike the batch process in which only products are transferred after the reaction is completed, a continuous process in which a plurality of reactors are connected in series or in parallel is used, whereby not only the products but also the unreacted materials are transferred in a mixed slurry state when being transferred to the next reactor. For this reason, flowability for transferring a reaction product and an unreacted material discharged from the reactor of the first reaction unit to the reactor at a rear end is decreased, which causes a pipe to easily clog to shorten an operation cycle.

In this regard, in the present invention, a continuous preparation process is applied to the preparation of the diester-based material, whereby a steam amount to be supplied to the reactor is decreased, reaching a desired conversion rate is facilitated, and a flowability problem caused by an unreacted material accumulating in pipes and pumps for transferring a lower discharge stream of the reactor of the first reaction unit and an operation cycle shortening problem, which are the problems of the conventional continuous preparation process, are solved.

According to an exemplary embodiment of the present invention, a reactor to esterify dicarboxylic acid and alcohol may be included.

The esterification may be performed by supplying dicarboxylic acid and alcohol to the reactor and directly esterifying dicarboxylic acid and alcohol in the presence of a catalyst. As such, the diester-based material and water as a by-product are generated by the esterification of dicarboxylic acid and alcohol. An operating temperature, an operating pressure, a time, and the type and content of catalyst are applied as they are as general conditions applicable in the art, or, if necessary, may be appropriately adjusted for process operation.

The dicarboxylic acid and alcohol may be mixed by a premixer before being supplied to the reactor and introduced in batches, or may be introduced to the reactor in batches from each separate line provided.

The dicarboxylic acid may include one or more selected from the group consisting of, for example, aromatic polyvalent carboxylic acids such as phthalic acid, isophthalic acid, terephthalic acid, and trimellitic acid; and saturated or unsaturated aliphatic polyvalent carboxylic acids such as adipic acid, sebacic acid, azelaic acid, succinic acid, maleic acid, and fumaric acid. As a specific example, the dicarboxylic acid may be solid, and as a more specific example, may be terephthalic acid.

The alcohol may be monohydric alcohol having 4 to 13, 5 to 12, or 6 to 10 carbon atoms. For example, the monohydric alcohol may include linear chain or branched chain alcohol such as n-butyl alcohol, iso-butyl alcohol, secondary butyl alcohol, n-pentyl alcohol, n-hexyl alcohol, n-heptyl alcohol, n-octyl alcohol, 2-ethylhexyl alcohol, iso-octyl alcohol, iso-nonyl alcohol, n-nonyl alcohol, iso-decyl alcohol, n-decyl alcohol, undecyl alcohol, and tridecyl alcohol. As a specific example, the alcohol may be 2-ethylhexyl alcohol.

The alcohol may be supplied to the reactor in an excessive amount relative to a stoichiometric amount required for a reaction with the dicarboxylic acid. For example, in the esterification, a mole ratio between the dicarboxylic acid and the alcohol may be 1:2 to 1:5 or 1:2 to 1:4.5. Dicarboxylic acid and alcohol are supplied as reactants at a mole ratio in the range, thereby increasing a forward reaction rate of esterification while minimizing an amount of steam used to easily reach a desired conversion rate.

The catalyst may include one or more selected from the group consisting of, for example, acid catalysts such as sulfuric acid, paratoluenesulfonic acid, and methanesulfonic acid; alkyl titanate catalysts such as tetraisopropyl titanate, tetrabutyl titanate, and tetra ethylhexyl titanate; and organic metal catalysts such as dibutyl tin oxide and butyl tin maleate. As a specific example, an organic titanium compound represented by alkyl titanate may be used as the catalyst, which increases an esterification rate to shorten a reaction time.

An operating temperature of the reactor may be, for example, 130° C. to 250° C., 160° C. to 240° C., or 190° C. to 230° C. Here, the operating temperature of the reactor may refer to the temperature of each reactor in the reaction units from the first reaction unit to the nth reaction unit. More specifically, each reactor in the reaction units from the first reaction unit to the nth reaction unit may be controlled identically or separately in the temperature range.

An operating pressure of the reactor may be 0 kg/cm$^2$G to 5.5 kg/cm$^2$ G, 0 kg/cm$^2$ G to 3 kg/cm$^2$ G, or 0 kg/cm$^2$ G to 2 kg/cm$^2$G. Here, the operating pressure of the reactor may refer to the pressure of each reactor in the reaction units from the first reaction unit to the nth reaction unit. More specifically, each reactor in the reaction units from the first reaction unit to the nth reaction unit may be controlled identically or separately in the pressure range.

According to an exemplary embodiment of the present invention, the dicarboxylic acid may be terephthalic acid and the alcohol may be 2-hetylhexyl alcohol. As such, when terephthalic acid and 2-ethylhexyl alcohol are introduced to the reactor in the presence of a catalyst and esterified, dioctyl terephthalate (DOTP) may be prepared as the diester-based material. The dioctyl terephthalate, which is a material which is widely used as an environmentally friendly and non-toxic plasticizer, has excellent compatibility with a polymer material such as PVC and excellent properties of low volatility and electrical properties.

According to an exemplary embodiment of the present invention, the reaction part has a total of n reaction units connected in series, and may be designed considering conversion rate control of the reaction and a residence time in each unit reaction and the composition of a product to be achieved. For example, n may be 2 to 8, 3 to 7, or 4 to 6, that is, the reaction part may include 2 to 8, 3 to 7, or 4 to 6 reaction units.

According to an exemplary embodiment of the present invention, a reaction unit 10, 20, 30, 40, or n0 may further include: a column 12, 22, 32, 42, or n2 which is supplied with an upper discharge stream from a reactor including alcohol and water vaporized during esterification from a reactor 11, 21, 31, 41, or n1 to perform gas-liquid separation, passes a gas phase through a condenser 13, 23, 33, 43, or n3 as an upper discharge stream to be supplied to a layer separator 14, 24, 34, 44, or n4, and supplies a liquid phase to the reactor 11, 21, 31, 41, or n1 as a lower discharge stream; and a layer separator 14, 24, 34, 44, or n4 which performs a separation into a water layer and an alcohol layer and refluxes only alcohol to the column while removing water.

In the reactor, the diester-based material as a reaction product and water as a by-product involved in esterification may be produced by esterification of dicarboxylic acid and alcohol. For example, the reaction product of the esterification may include the diester-based material, water, and an unreacted material.

For increasing a forward reaction rate of the esterification, water as a by-product should be effectively removed to prevent a reverse reaction and catalyst deactivation by water. In this regard, as a method of removing water which is the by-product, water is vaporized and discharged. Here, when water is vaporized, alcohol having a similar boiling point to water is also vaporized together, and the vaporized alcohol may be recovered and refluxed again to the reactor to maintain the concentration of the reactant high and water may be removed.

Specifically, in the reactor, as esterification proceeds, alcohol participates in the reaction, but alcohol which does not participate in the reaction and is vaporized due to esterification at a higher temperature than the boiling point of alcohol is inevitably present, and simultaneously, water occurs as a by-product in addition to the diester-based material as a reaction product and water may be vaporized with alcohol and discharged as the upper discharge stream from the reactor. The vaporized water and alcohol are discharged as the upper discharge stream of the reactor and may be supplied to the column.

In the column, gaseous alcohol and water introduced from the reactor may be liquefied by liquid alcohol at a low temperature supplied from the layer separator to an upper portion of the column, most of the gaseous alcohol is selectively liquefied and discharge as the lower discharge stream from the column, the lower discharge stream from the column including the liquid alcohol is introduced again to the reactor, and the liquid alcohol may participate in the esterification again.

As such, by passing the upper discharge stream from the reactor through the column, water included in the upper discharge stream from the reactor is condensed and introduced to the reactor again, thereby improving a forward reaction rate.

In addition, alcohol vaporized from the reactor is refluxed to the reactor again, thereby maintaining an excessive amount ratio of alcohol in the reactor, and water as the by-product of esterification is discharged to the outside of a reaction system and removed, thereby preventing reflux of water to the reactor to prevent a reaction rate reduction and catalyst performance deterioration in the reactor.

Meanwhile, gaseous water and unliquefied gaseous alcohol in the column are discharged as the upper discharge stream from the column, and the upper discharge stream from the column passes through the condenser to be supplied to the layer separator. Specifically, the layer separator is equipment for layer-separating liquid alcohol and water, and at this point, gaseous alcohol and water need to be liquefied in the layer separator or before being introduced to the layer separator. Accordingly, a condenser is installed in an arbitrary area of a line where the upper discharge stream from the column is transferred to the layer separator, and heat of gaseous alcohol and water is removed by the condenser, thereby liquefying alcohol and water before being introduced to the layer separator.

Layer separation in the layer separator may be performed by a difference in density between alcohol and water. As a specific example, since the density of alcohol is lower than the density of water, an alcohol layer may be formed in the upper portion of the layer separator and a water layer may be formed in the lower portion. As such, after the water layer and the alcohol layer are separated in the layer separator, only alcohol may be selectively separated through a line connected to the upper portion of the column from the alcohol layer and refluxed to the column. In addition, water is removed through a discharge line for discharging water to the outside from the water layer or may be recycled in various routes.

Since alcohol having a lower temperature by condensation in the column is refluxed to the reactor to lower an internal temperature of the reactor, energy such as high-pressure steam or high temperature steam should be supplied for maintaining the internal temperature of the reactor to supply a heat amount into the reactor separately. Since the high-pressure steam has an equilibrium temperature (high temperature) by high pressure, a heat amount may be supplied into the reactor by supply of high-pressure steam.

The reaction product in the reactor is separated through the lower discharge stream of the reactor, the lower discharge stream in each reactor of the reaction units from the first reaction unit to the n-lth reaction unit may be supplied to the reactor of the reaction unit at the rear end of each reaction unit, and the lower discharge stream from the reactor of the reaction unit at the rearmost end may be separated and purified and productized. For example, when a diester-based material is prepared by including a reaction part in which four reaction units are connected in series, a lower discharge stream from a reactor 11 of a first reaction unit 10 is supplied to a reactor 21 of a second reaction unit 20, a lower discharge stream from the reactor 21 of the second reaction unit 20 is supplied to a reactor 31 of a third reaction unit 30, a lower discharge stream from the reactor 31 of the third reaction unit 30 is supplied to a reactor 41 of a fourth reaction unit 40, and a lower discharge stream from the reactor 41 of the fourth reaction unit 40 may be separated and purified to be productized.

In order that the lower discharge stream from the reactor in each of the reaction units 10, 20, 30, 40, and n0 is transferred to the reactor of the reaction unit at the rear end or transferred to a subsequent separation purification process, a pump 15, 25, 35, 45, or n5 may be provided in a lower discharge line 11a, 21a, 31a, 41a, or n1a of each reactor.

The diester-based material included in the lower discharge stream from the reactor of the reaction unit at the rearmost end may be purified by a known method. For example, when esterification is performed by an organic titanium compound as a catalyst, water is added to the obtained diester-based material to deactivate the catalyst and then the material may be distilled with water vapor to evaporate and remove unreacted alcohol remaining therein. In addition, the material may be treated with an alkaline material to neutralize a remaining dicarboxylic acid. In addition, a solid is removed by filtration, thereby obtaining a high-purity diester-based material.

According to an exemplary embodiment of the present invention, in the continuous preparation process of a diester-based material, dicarboxylic acid and alcohol are esterified in the reactor of the first reaction unit to prepare a reaction product, and a lower discharge stream including the reaction product may be supplied to the reaction unit at the rear end through a lower discharge line.

Specifically, a conversion rate in the reactor 11 of the first reaction unit 10 is 10% to 80%, 10% to 70%, or 10% to 60%, and a content of dicarboxylic acid as an unreacted material in the lower discharge stream from the reactor including the reaction product is higher than that in the reaction units at the rear end. Here, the content of the dicarboxylic acid in the lower discharge stream from the reactor of the first reaction unit varies with the conversion rate, but for example, may be 3 vol % to 20 vol %, 3 vol % to 18 vol %, or 3 vol % to 15 vol %. As such, when the content of the unreacted material in the lower discharge stream from the reactor is high, the unreacted material may accumulate in pipes and pumps where the lower discharge stream from the reactor is transferred, a problem may arise in transfer due to decreased flowability by an accumulating material, and a retention time is extended to cause a pipe, a pump, and the like to be easily clogged. When the pipe or pump clogs, operation should be shut down and the pipe or pump should be dismantled and washed, and in this case, a long time is taken for washing, and when it is difficult to use a pump or pipe for temporary use, a time to stop operation is increased, which leads to an economic loss and a price increase problem for the product to be produced.

In this regard, in the present invention, a liquid supply line L1 is connected to an arbitrary area of the lower discharge line 11a of the reactor 11 of the first reaction unit 10, and a liquid material is supplied through the liquid supply line L1, thereby increasing a linear velocity of the lower discharge stream from the reactor of the first reaction unit to a limit velocity or more at which a solid component in the fluid accumulates in the pipes and pumps to improve flowability, and preventing clogging of the pipes and pumps to extend a maintenance period of the pipes and pumps. Here, the limit velocity is a velocity at which the solid component in the fluid starts to accumulate, and may be determined by an empirical formula related to a slurry limit velocity. Specifically, the limit velocity may use a Durand equation, and may be calculated with reference to a rheology-based empirical formula. Here, the calculation may be performed by applying an average particle size and density of the solid component, a volume fraction, a fluid temperature, and the like as a variable.

The liquid supply line L1 may be connected to a front end of the pump 15 installed in the lower discharge line 11a of the reactor 11 of the first reaction unit 10.

Specifically, a pump is provided in an arbitrary area of the lower discharge line 11a of the reactor of the first reaction unit, and the liquid supply line L1 may be connected to the front end of the pump. In this case, before passing through the pump, the volume fraction of dicarboxylic acid which is an unreacted material in the lower discharge stream from the reactor of the first reaction unit is lowered and the linear velocity is increased, thereby facilitating transfer to the reactor at the rear end using the pump and preventing clogging of the pump and the pipe.

In the lower discharge line 11a of the reactor of the first reaction unit, a mixing device for more effectively mixing the lower discharge stream from the reactor of the first reaction unit and the liquid material may be further provided in an arbitrary area between a point to which the liquid supply line L1 is connected and a point where the pump is provided. The type of mixing device is not particularly limited, and for example, a device such as a line mixer may be used.

By mixing the lower discharge stream from the reactor 11 of the first reaction unit 10 with the liquid material supplied through the liquid supply line L1, the content of dicarboxylic acid which is a solid unreacted material in the lower discharge stream from the reactor of the first reaction unit is lowered, and thus, the volume fraction of the solid may be lowered. By controlling the solid fraction and the flow velocity of the lower discharge stream from the reactor of the first reaction unit, flowability to the reactor of the reaction unit at the rear end may be improved and clogging of the pipes and pumps may be prevented to extend a maintenance period.

The liquid material to be supplied through the liquid supply line L1 may improve the viscosity of the lower discharge stream from the reactor of the first reaction unit, without affecting a desired conversion rate to be reached and an amount of steam used. For example, the liquid material may be alcohol or a lower discharge stream from the reactor of any one or more reaction units of the reaction units from the second reaction unit to the nth reaction unit. As a more specific example, the liquid material may be alcohol or a lower discharge stream from the reactor of the reaction unit at the rearmost end. Here, details of the type of alcohol may be as described above.

As the liquid material, when the lower discharge stream from the reactor of any one or more reaction units of the reaction units from the second reaction unit to the nth reaction unit is supplied, the stream may be supplied by a method in which a lower discharge line 21a, 31a, 41a, or n1a of the reactor of the corresponding reaction unit is branched to be connected to the lower discharge line 11a of the reactor of the first reaction unit.

When alcohol is supplied as the liquid material, since alcohol has a lower viscosity than the diester-based material as a product, not only the flow velocity of the lower discharge stream from the reactor of the first reaction unit but also a viscosity improvement effect may be obtained.

In addition, when the lower discharge stream from the reactor of any one or more reaction units of the reaction units from the second reaction unit to the nth reaction unit as the liquid material, the cost of further use of alcohol is reduced, the solid volume fraction of the lower discharge stream from the reactor of the first reaction unit is lowered, and the flow velocity is improved. In particular, when the lower discharge stream from the reactor of the reaction unit at the rearmost end, which is a reaction product having a very low content of unreacted dicarboxylic acid, is supplied as the liquid material, an improvement effect may be excellent.

A supply flow rate of the liquid material may be appropriately adjusted for controlling the content and viscosity of dicarboxylic acid in the lower discharge stream from the reactor of the first reaction unit. For example, the flow rate (mass flow rate) of the liquid material supplied through the liquid supply line L1 may be 0.1% to 15%, 1% to 10%, or 1% to 8% of the flow rate (mass flow rate) of the lower discharge stream from the reactor 11 of the first reaction unit 10. The flow rate of the liquid material supplied through the liquid supply line L1 may be appropriately adjusted considering the conversion rate in the reactor 11 of the first reaction unit 10 within the range. By supplying the liquid material within the flow rate range described above, an alcohol excessive amount ratio in the reactor at the rear end may be increased to increase reactivity, and the unreacted material may be prevented from accumulating in pipes and pumps during transfer of the lower discharge stream from the reactor 11 of the first reaction unit 10.

However, though a method of directly supplying alcohol to the reactor of the first reaction unit as the liquid material to facilitate a forward reaction to increase a conversion rate, and thus, lowering the content of unreacted dicarboxylic acid in the lower discharge stream from the reactor may be considered, but in this case, due to an increase of an amount of alcohol vaporized in the reactor by an excessive increase of an excessive amount ratio of dicarboxylic acid and alcohol injected into the reactor of the first reaction unit and a reflux amount which is a reflux amount of alcohol vaporized and refluxed again to the reactor after passing through a column, a layer separator, and a column, a steam amount required for reactor heating is increased, and operating costs and energy costs of the entire process inefficiently rise to decrease product cost competitiveness.

In some cases, the first reaction unit may be installed in a structure in which two or more reaction units are connected in parallel. When the first reaction unit is configured by connecting the two or more reaction units in parallel, dicarboxylic acid and alcohol may be supplied to each of the reactors of the reaction units connected in parallel, and a liquid supply line L1 may be connected to the lower discharge line of each reactor. For example, the first reaction unit may be installed in a structure in which two to four or two or three reaction units are connected in parallel depending on the productivity to be required. In this case, the size of the apparatus may be decreased.

According to an exemplary embodiment of the present invention, in the method of preparing a diester-based material, if necessary, devices such as a distillation column, a condenser, a reboiler, a valve, a pump, a separator, and a mixer may be further installed.

Hereinabove, the method of preparing a diester-based material according to the present invention has been described and illustrated in the drawings, but the description and the illustration in the drawings are the description and the illustration of only core constitutions for understanding of the present invention, and in addition to the process and apparatus described above and illustrated in the drawings, the process and the apparatus which are not described and illustrated separately may be appropriately applied and used for carrying out the method of preparing a diester-based material according to the present invention.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLE

Examples 1 to 7

Dioctyl terephthalate (DOTP) was prepared according to the process flow diagram shown in FIG. 2.

Specifically, terephthalic acid (TPA) and 2-ethylhexyl alcohol (2EH) were introduced to a reactor 11 of a first reaction unit 10 operated at a temperature of 200° C. while maintaining a mole ratio of 1:2 to 4.5 to perform esterification while adjusting a conversion rate to 10% to 70% in the presence of a catalyst, and for the upper discharge stream vaporized in the reactor 11, 2-ethylhexyl alcohol was fluxed to the reactor 11 and water was removed, using a column 12, a condenser 13, and a layer separator 14. In addition, the reaction product discharged through a lower discharge line 11a in the reactor 11 was mixed with 2-ethylhexyl alcohol supplied through a liquid supply line L1 and then passed through a pump 15 to be supplied to a reactor 21 of a second reaction unit 20.

Like the flow of operating in the first reaction unit 10, operation was continuously performed through the second reaction unit 20, a third reaction unit 30, and a fourth reaction unit 40 which is at the rearmost end, and the lower discharge stream from a reactor 41 of the fourth reaction unit 40 was separated and purified to obtain dioctyl terephthalate.

Here, ASPEN PLUS available from Aspen Technology Inc. which is a commercial process simulation program was used to measure simulation results, which are shown in the following Table 1.

TABLE 1

| | Example | | | | | | |
|---|---|---|---|---|---|---|---|
| | 1 | 2 | 3 | 4 | 5 | 6 | 7 |
| Conversion rate (%) | 10.0 | 20.0 | 30.0 | 40.0 | 50.0 | 60.0 | 70.0 |
| TPA content (vol %) | 13.7 | 12.3 | 10.6 | 9.2 | 7.7 | 6.2 | 4.8 |
| Limit velocity (m/s) | 1.00 | 0.99 | 0.99 | 0.98 | 0.97 | 0.96 | 0.95 |
| Liquid material addition rate (%) | 8 | 6 | 7 | 5 | 4 | 4 | 2 |

TABLE 1-continued

| | Example | | | | | | |
|---|---|---|---|---|---|---|---|
| | 1 | 2 | 3 | 4 | 5 | 6 | 7 |
| Linear velocity (m/s) | 1.01 | 0.99 | 1.00 | 0.99 | 0.98 | 0.98 | 0.96 |
| Solid accumulation | x | x | x | x | x | x | x |

In Tables 1 to 5, the conversion rate refers to a conversion rate reached in the reactor 11 of the first reaction unit 10.

In addition, a TPA content refers to a volume fraction of terephthalic acid in the lower discharge stream from the reactor 11 of the first reaction unit 10.

In addition, the limit velocity is a velocity at which terephthalic acid in the lower discharge stream from the reactor 11 of the first reaction unit 10 started to accumulate, and was calculated by using the following Durand equation, setting an average particle size of terephthalic acid as 100 µm and a density as 1520 kg/m$^3$ as variables, and substituting the operating temperature of the reactor 11 of the first reaction unit 10 and a TPA content.

In addition, the liquid material addition rate is a percentage of a flow rate of 2-ethylhexyl alcohol supplied to the liquid supply line L1 relative to the total flow rate of the lower discharge stream from the reactor 11 of the first reaction unit 10.

In addition, the linear velocity refers to a linear velocity of a mixed stream in which the lower discharge stream from the reactor 11 of the first reaction unit 10 and 2-ethylhexyl alcohol supplied to the liquid supply line L1 are mixed.

In addition, the solid accumulation is represented as ○ when the linear velocity was less than the limit velocity and x when the linear velocity was more than the limit velocity, upon comparison of that linear velocity and the limit velocity.

Examples 8 to 13

The process was performed in the same manner as in Example 1, except that the operating temperature of the reactor 11 of the first reaction unit 10 was controlled to 215° C. instead of 200° C. and the conversion rate in the reactor 11 of the first reaction unit 10 was adjusted to 10% to 60%.

Here, ASPEN PLUS available from Aspen Technology Inc. which is a commercial process simulation program was used to measure simulation results, which are shown in the following Table 2.

TABLE 2

| | Example | | | | | |
|---|---|---|---|---|---|---|
| | 8 | 9 | 10 | 11 | 12 | 13 |
| Conversion rate (%) | 10.0 | 20.0 | 30.0 | 40.0 | 50.0 | 60.0 |
| TPA content (vol %) | 13.8 | 12.3 | 10.7 | 9.2 | 7.8 | 6.3 |
| Limit velocity (m/s) | 1.00 | 0.99 | 0.99 | 0.98 | 0.97 | 0.96 |
| Liquid material addition rate (%) | 5 | 4 | 4 | 3 | 2 | 1 |
| Linear velocity (m/s) | 1.01 | 1.00 | 1.00 | 0.99 | 0.98 | 0.97 |
| Solid accumulation | x | x | x | x | x | x |

Referring to Tables 1 and 2, when the diester-based material was prepared according to the method of the present invention, in the case of connecting the liquid supply line L1 to the lower discharge line 11*a* for transferring the lower discharge stream from the reactor 11 of the first reaction unit 10 to supply 2-ethylhexyl alcohol, terephthalic acid may be prevented from accumulating in the lower discharge line 11*a* of the reactor of the first reaction unit 10. Specifically, it is seen that in the present invention, by supplying 2-ethylhexyl alcohol at an appropriate flow rate depending on the volume fraction of terephthalic acid which is an unreacted material in the lower discharge stream which varies with the operating temperature and the conversion rate of the reactor 11 of the first reaction unit 10, terephthalic acid is prevented from accumulating in the lower discharge line 11*a* of the reactor of the first reaction unit 10 to prevent clogging of pipes and pumps, and thus, a maintenance period of pipes and pumps may be extended.

Examples 14 to 16

In Examples 14 to 16, dioctyl terephthalate (DOTP) was prepared according to each of the process flow diagrams shown in FIGS. 3 to 5.

Specifically, in Examples 14 to 16, preparation was performed in the same flow as Example 1, but a lower discharge stream from a reactor 21 from a second reaction unit 20 in Example 14, a lower discharge stream from a reactor 31 of a third reaction unit 30 in Example 15, and a lower discharge stream from a reactor 41 of a fourth reaction unit 40 in Example 16 were branched and supplied as the liquid material supplied through the liquid supply line L1.

Here, ASPEN PLUS available from Aspen Technology Inc. which is a commercial process simulation program was used to measure simulation results, which are shown in the following Table 3.

TABLE 3

| | Example 14 | Example 15 | Example 16 |
|---|---|---|---|
| Conversion rate (%) | 10.0 | 10.0 | 10.0 |
| TPA content (vol %) | 14.0 | 13.9 | 13.8 |
| Limit velocity (m/s) | 1.00 | 1.00 | 1.00 |
| Liquid material addition rate (%) | 5 | 5 | 5 |
| Linear velocity (m/s) | 1.01 | 1.01 | 1.01 |
| Solid accumulation | x | x | x |

Referring to Table 3, when the diester-based material was prepared according to the method of the present invention, even in the case of connecting the liquid supply line L1 to the lower discharge line 11*a* for transferring the lower discharge stream from the reactor 11 of the first reaction unit 10 to supply the lower discharge stream from the reactor of any one or more reaction units in the reaction units from the second reaction unit to the nth reaction unit as the liquid material, the same effects as Examples 1 to 13 in which 2-ethylhexyl alcohol was supplied as the liquid material was able to be obtained.

COMPARATIVE EXAMPLE

Comparative Examples 1 to 7

Dioctyl terephthalate (DOTP) was prepared according to the process flow diagram shown in FIG. 6.

Specifically, terephthalic acid and 2-ethylhexyl alcohol were introduced to the reactor 11 of the first reaction unit 10 operated at a temperature of 200° C. while maintaining a mole ratio of 1:2 to 4.5 to perform esterification while adjusting a conversion rate to 10% to 70% in the presence of a catalyst, and for the upper discharge stream vaporized in the reactor 11, 2-ethylhexyl alcohol was fluxed to the reactor 11 and water was removed, using the column 12, the condenser 13, and the layer separator 14. In addition, the reaction product discharged through a lower discharge line 11a in the reactor 11 was passed through the pump 15 to be supplied to the reactor 21 of the second reaction unit 20.

Like the flow of operating in the first reaction unit 10, operation was continuously performed through the second reaction unit 20, a third reaction unit 30, and a fourth reaction unit 40, and the lower discharge stream from a reactor 41 of the fourth reaction unit 40 which was at the rearmost end was separated and purified to obtain dioctyl terephthalate.

Here, ASPEN PLUS available from Aspen Technology Inc. which is a commercial process simulation program was used to measure simulation results, which are shown in the following Table 4.

TABLE 4

|  | Comparative Example | | | | | | |
|---|---|---|---|---|---|---|---|
|  | 1 | 2 | 3 | 4 | 5 | 6 | 7 |
| Conversion rate (%) | 10.0 | 20.0 | 30.0 | 40.0 | 50.0 | 60.0 | 70.0 |
| TPA content (vol %) | 14.8 | 13.0 | 11.3 | 9.7 | 8.1 | 6.4 | 4.8 |
| Limit velocity (m/s) | 1.00 | 1.00 | 0.99 | 0.98 | 0.97 | 0.96 | 0.95 |
| Liquid material addition rate (%) | 0 | 0 | 0 | 0 | 0 | 0 | 0 |
| Linear velocity (m/s) | 0.94 | 0.94 | 0.94 | 0.94 | 0.94 | 0.94 | 0.94 |
| Solid accumulation | ○ | ○ | ○ | ○ | ○ | ○ | ○ |

Comparative Examples 8 to 13

The process was performed in the same manner as in Comparative Example 1, except that the operating temperature of the reactor 11 of the first reaction unit 10 was controlled to 215° C. instead of 200° C. and the conversion rate in the reactor 11 of the first reaction unit 10 was adjusted to 10% to 60%.

Here, ASPEN PLUS available from Aspen Technology Inc. which is a commercial process simulation program was used to measure simulation results under the conditions to reach the conversion rate of 99.9%, which are shown in the following Table 5.

TABLE 5

|  | Comparative Example | | | | | |
|---|---|---|---|---|---|---|
|  | 8 | 9 | 10 | 11 | 12 | 13 |
| Conversion rate (%) | 10.0 | 20.0 | 30.0 | 40.0 | 50.0 | 60.0 |
| TPA content (vol %) | 14.5 | 12.8 | 11.1 | 9.5 | 7.9 | 6.3 |
| Limit velocity (m/s) | 1.00 | 0.99 | 0.99 | 0.98 | 0.97 | 0.96 |
| Liquid material addition rate (%) | 0 | 0 | 0 | 0 | 0 | 0 |
| Linear velocity (m/s) | 0.96 | 0.96 | 0.96 | 0.96 | 0.96 | 0.96 |
| Solid accumulation | ○ | ○ | ○ | ○ | ○ | ○ |

Referring to Tables 4 and 5, in Comparative Examples 1 to 13 in which the liquid supply line was not provided in the lower discharge line 11a for transferring the lower discharge stream from the reactor 11 of the first reaction unit 10, it is seen that terephthalic acid accumulated in the lower discharge line 11a of the reactor of the first reaction unit 10 to clog pipes and pumps, which caused the maintenance period of pipes and pumps to be shortened.

Comparative Example 14

Dioctyl terephthalate (DOTP) was prepared according to the process flow diagram shown in FIG. 7.

Specifically, DOTP was prepared in the same flow as Example 1, except that the liquid supply line L1 was connected to the reactor 11 of the first reaction unit 10 to supply 2-ethylhexyl alcohol.

In comparison with the examples, in Comparative Example 14 in which the liquid supply line L1 was not connected to the lower discharge line 11a of the reactor of the first reaction unit 10 but connected to the reactor 11, a flow rate supplied to the reactor 11 of the first reaction unit 10 was increased to decrease a residence time, thereby increasing a volume fraction of solid terephthalic acid in the lower discharge stream. In addition, the excessive amount ratio of terephthalic acid and 2-ethylhexyl alcohol injected into the reactor 11 of the first reaction unit 10 was excessively increased to increase an amount of 2-ethylhexyl alcohol vaporized in the reactor and a reflux amount of 2-ethylhexyl alcohol refluxed to the reactor again after passing through the column, layer separator, and column, thereby increasing a steam amount required for reactor heating, and thus, operating costs and energy costs of the entire process were inefficiently increased to decrease product cost competitiveness.

The invention claimed is:

1. A method of preparing a diester-based material in a continuous preparation process using a reaction part in which a total of n reaction units from a first reaction unit to an $n^{th}$ reaction unit are connected in series, each of the reaction units including a reactor which esterifies a dicarboxylic acid and an alcohol and a lower discharge line, the method comprising:
   esterifying the dicarboxylic acid and the alcohol in the reactor of the first reaction unit to produce a reaction product,
   supplying a lower discharge stream connected to a bottom of the reactor and including the reaction product to at least one reaction unit at a rear end through the lower discharge line; and
   supplying a liquid material through a liquid supply line connected to the lower discharge line of the reactor of the first reaction unit thereby controlling a solid fraction and a flow velocity of the lower discharge stream from the reactor,
   wherein a flow rate of the liquid material supplied to the liquid supply line is from 1% to 15% of a flow rate of the lower discharge stream from the reactor of the first reaction unit
   the liquid material includes the alcohol and the lower discharge stream from the reactor of any one or more reaction units including a second reaction unit to the $n^{th}$ reaction unit.

2. The method of preparing a diester-based material of claim 1, wherein a mole ratio of the dicarboxylic acid to the alcohol introduced to the first reaction unit is from 1:2 to 1:5.

3. The method of preparing a diester-based material of claim 1,
   wherein a pump is provided in the lower discharge line from the reactor of the first reaction unit, and
   the liquid supply line is connected to a front end of the pump.

4. The method of preparing a diester-based material of claim 1, wherein the flow rate of the liquid material supplied to the liquid supply line is from 1% to 8% of the flow rate of the lower discharge stream from the reactor of the first reaction unit.

5. The method of preparing a diester-based material of claim 1, wherein a conversion rate in the reactor of the first reaction unit is from 10% to 80%.

6. The method of preparing a diester-based material of claim 1, wherein a content of dicarboxylic acid in the lower discharge stream from the reactor of the first reaction unit is from 3 vol % to 20 vol %.

7. The method of preparing a diester-based material of claim 1, wherein an operating temperature of the reactor of the first reaction unit is from 130° C. to 250° C.

8. The method of preparing a diester-based material of claim 1, wherein the esterifying further includes performing gas-liquid separation with a column, a condensor, and a layer separator in at least one of the reaction units;

the gas-liquid separation step comprising:
supplying an upper discharge stream, including alcohol and water vaporized during the esterification, from the reactor of the at least one of the reaction units to the column;
supplying a gas phase separated from the column to the condenser, condensing the gas phase, and then supplying the condensed gas phase to the layer separator;
supplying a liquid phase separated from the column to the reactor;
separating the condensed gas phase into a water layer and an alcohol layer in the layer separator;
supplying the separated alcohol layer to the column as a reflux stream; and removing the water layer from the reaction unit.

9. The method of preparing a diester-based material of claim 1, wherein n is from 2 to 8.

10. The method of preparing a diester-based material of claim 1, wherein the dicarboxylic acid includes terephthalic acid and the alcohol includes 2-ethylhexyl alcohol.

11. The method of preparing a diester-based material of claim 1, wherein a flow rate of the liquid material supplied to the liquid supply line is from 2% to 15% of a flow rate of the lower discharge stream from the reactor of the first reaction unit.

12. The method of preparing a diester-based material of claim 1, wherein a flow rate of the liquid material supplied to the liquid supply line is from 3% to 15% of a flow rate of the lower discharge stream from the reactor of the first reaction unit.

13. The method of preparing a diester-based material of claim 1, wherein a flow rate of the liquid material supplied to the liquid supply line is from 4% to 15% of a flow rate of the lower discharge stream from the reactor of the first reaction unit.

14. The method of preparing a diester-based material of claim 1, wherein a flow rate of the liquid material supplied to the liquid supply line is from 5% to 15% of a flow rate of the lower discharge stream from the reactor of the first reaction unit.

15. The method of preparing a diester-based material of claim 1, wherein a conversion rate in the reactor of the first reaction unit is from 10% to 60%.

16. The method of preparing a diester-based material of claim 1, wherein a mole ratio of the dicarboxylic acid to the alcohol introduced to the first reaction unit is from 1:2 to 1:4.5.

17. The method of preparing a diester-based material of claim 1, wherein an operating pressure of the reactor is 0 kg/cm$^2$ G to 5.5 kg/cm$^2$ G.

* * * * *